J. A. MILLIKEN.
CHUCK.
APPLICATION FILED AUG. 21, 1916.
1,243,090.
Patented Oct. 16, 1917.
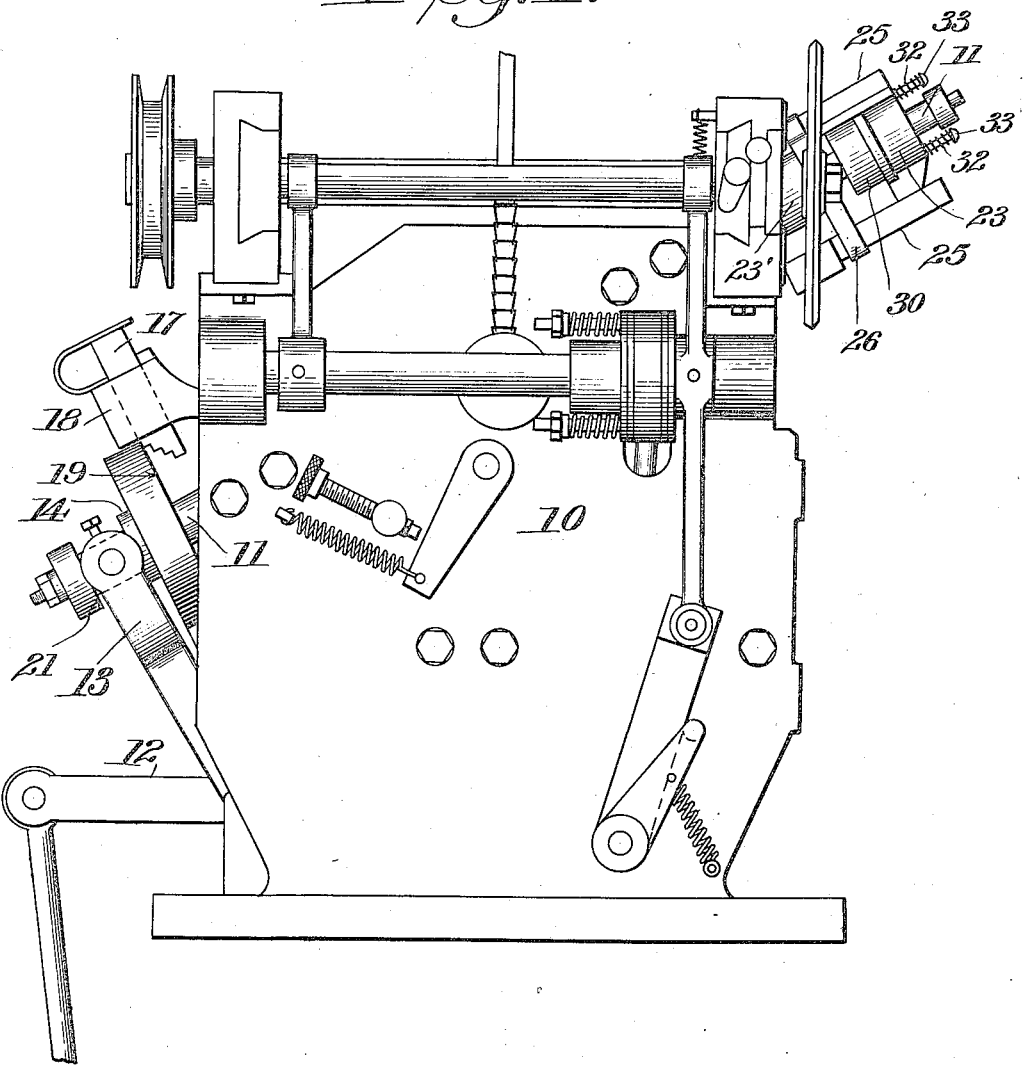
Fig. 1.
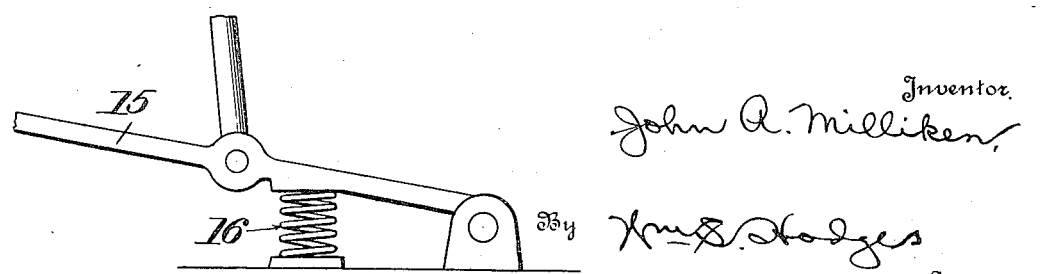

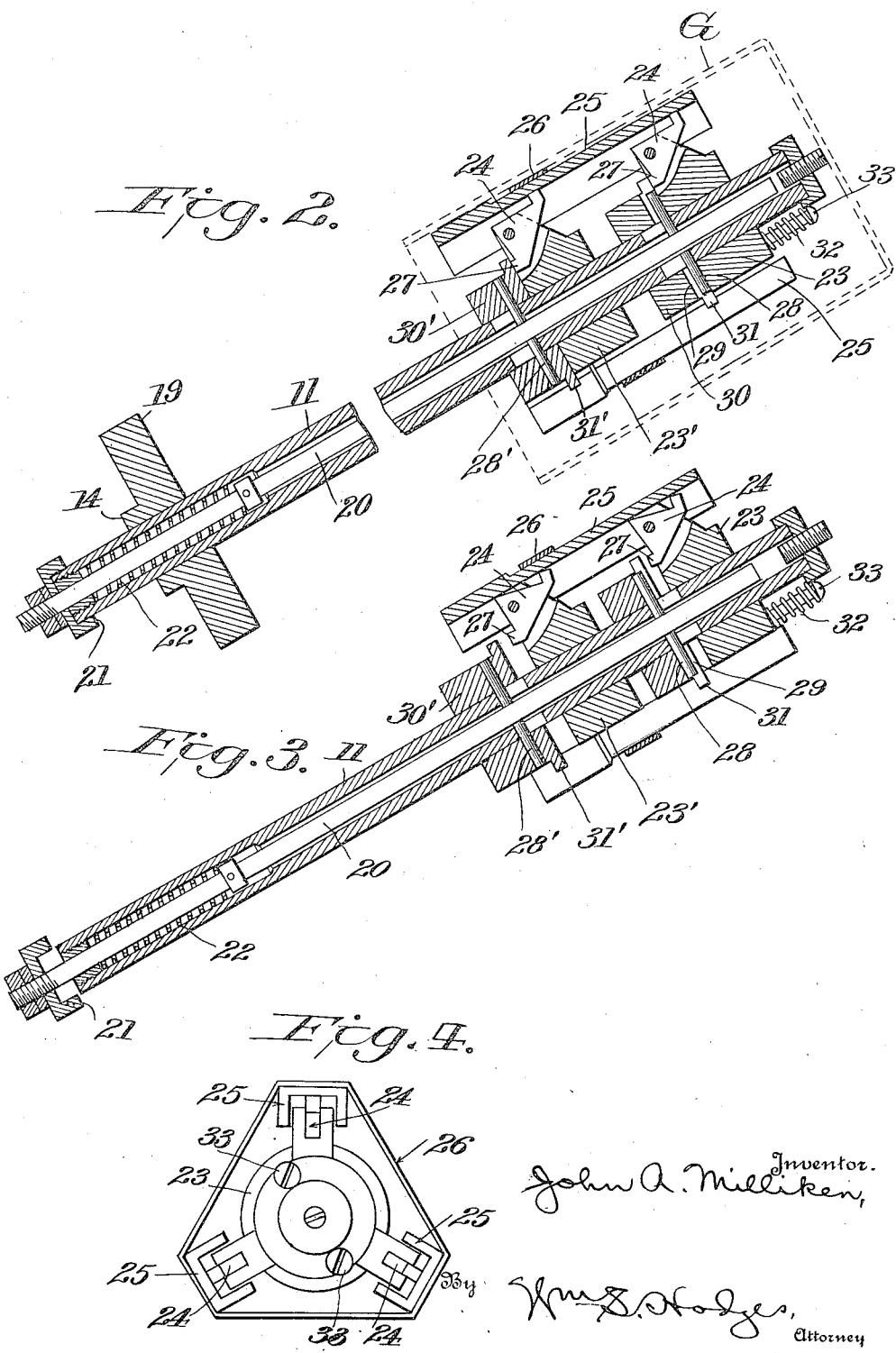

UNITED STATES PATENT OFFICE.

JOHN A. MILLIKEN, OF BAYONNE, NEW JERSEY.

CHUCK.

1,243,090. Specification of Letters Patent. Patented Oct. 16, 1917.

Application filed August 21, 1916. Serial No. 116,171.

*To all whom it may concern:*

Be it known that I, JOHN A. MILLIKEN, a citizen of the United States, residing at Bayonne, in the county of Hudson and State of New Jersey, have invented new and useful Improvements in Chucks, of which the following is a specification.

This invention is a chuck for supporting glass tumblers, or similar glass articles, during the cutting or grinding of ornamental designs on the surfaces thereof.

One of the objects of the invention is to provide a chuck provided with means for maintaining an effective internal engagement with a hollow article, such engagement being of uniform pressure at all points, and with sufficient force to insure rotation of said article with the chuck. A further object is to provide a chuck of this character so constructed that the article to be supported by it may be readily and quickly placed into or removed from operative position.

The invention will be hereinafter fully set forth and particularly pointed out in the claims.

In the accompanying drawings:—

Figure 1 is a side elevation of a glass cutting machine with the invention applied thereto. Figs. 2 and 3 are longitudinal sectional views illustrating different positions of the chuck. Fig. 4 is a front end view.

For the purposes of illustration the improved chuck forming the subject-matter of this invention, is shown and described as forming part of the glass cutting machine, for which a companion application has been filed in the United States Patent Office, but it will be understood that said chuck is not limited to any particular type of machine.

Referring to the drawing, 10 designates a glass cutting machine. Rotatably mounted in suitable bearings carried by the frame of the machine 10 is a normally inclined chuck-shaft 11. The chuck shaft 11, is slidable longitudinally in its bearings, movement being imparted thereto by means of a bell crank lever 12, one arm of which is provided with a fork 13, engaging shoulder 14, formed in said shaft, the other arm of said bell crank lever being connected with a treadle 15. A spring 16, or other suitable device, is employed to press said chuck shaft upwardly against a spacing bar 17, supported in a suitable carrier 18, suitably supported by the machine frame, said spacing bar being positioned to engage an annular flange 19 attached to the shaft 14, to limit longitudinal movement of said shaft in one direction.

As shown in the drawings, the chuck shaft 11 is made hollow, and extending longitudinally through the same is a draw-bar 20, provided at its lower end with a collar 21, slidably mounted upon the chuck shaft, and held in engagement with the fork 13, of the bell crank lever 12, by means of a spring 22, acting between abutments upon said draw bar and said chuck shaft respectively. Rigidly secured to the upper end of the chuck shaft 11, are hubs 23 and 23', provided with pivoted fingers 24, which support glass engaging bars 25, of approximate U-shape in cross section, an elastic band 26 encircling the bar 25 acting to maintain them normally under compression and in contracted relation. Each finger 24 is provided with a rearwardly extended projection 27. The chuck shaft 11 is longitudinally slotted adjacent the hubs 23 and 23', to accommodate pins 28 and 28', attached to the draw bar 20. The pin 28 projects through a slotted portion 29, formed in a slidable hub 30, said hub being provided with a flange 31 normally held against the projections 27, of the contiguous fingers 24, by means of springs 32, encircling bolts, or similar devices 33, attached to said collar, and extended through lugs projecting from the hub 23. The pin 28', rigidly connects a hub 30', with the draw-bar 20, said hub 30' being provided with a flange 31', positioned to engage the projections 27 of the fingers 24 carried by the hub 23'. By means of this arrangement the flanges 31 and 31', acting against the projections 27, of the fingers 24 hold the bars 25, outwardly into engagement with the inner surface of the glass to be acted upon, and against the tension of the elastic band 26, until the treadle 25 is pushed downwardly, drawing the draw bar 20 downwardly, with the result that the hub 30' is positively moved at once with the drawbar, permitting the fingers 24 carried by the hub 23', to move inwardly under the tension of the band 26, and as the draw bar 20 continues to move, the pin 28 will traverse the length of the slot 29, and then withdraw the hub 30 from engagement with the fingers 24 carried by the hub 23 whereupon a glass upon the chuck may be removed and a new one substituted. The arrangement above described permits of the ready and prompt placing of the glass into, and removing it from position to be acted upon by the grinding device and at the same time insures that the glass will be firmly engaged at all points by a uniform pressure of sufficient force to retain the same in position and insure its rotation with the chuck during the operations of the machine.

In operation, the operator first presses down upon the treadle 15, thereby shifting the draw-bar 20, so as to contract the chuck, whereupon the glass may be placed over the chuck as shown in the drawing. Upon releasing the treadle, the chuck members will accurately and uniformly engage the glass with sufficient force to insure that the glass will rotate with the chuck. The cutting mechanism is then automatically engaged with the surface of the article carried by the chuck in suitable manner, and upon completion of this operation is automatically disengaged from the said article. The cutting mechanism moves away from the article carried by the chuck a sufficient distance to permit said article to be rotated with the chuck. When the operation of the machine has been completed, the treadle 15 is depressed to contract the chuck, first withdrawing the inner ends of bars 25, and then the outer ends thereof, whereupon the glass may be withdrawn, and another one substituted.

Having thus explained the nature of the invention, and described an operative manner of constructing and using the same, although without attempting to set forth all of the forms in which it may be made, or all of the forms of its use, the following is claimed:—

1. A chuck of the character described comprising a shaft, spaced apart sets of pivoted fingers carried by said shaft, glass-engaging bars supported by said fingers and disconnected therefrom, means normally acting upon said bars to yieldably retain the same in retracted position, and means carried by said shaft to move said bars in opposition to said retracting means.

2. A chuck of the character described comprising a shaft, spaced apart sets of pivoted fingers carried by said shaft, glass-engaging bars supported by said fingers, and a resilient band embracing all of said bars.

3. A chuck of the character described comprising a shaft, spaced apart sets of pivoted fingers carried by said shaft, glass-engaging bars supported by said fingers and disconnected therefrom, collars slidably mounted on said shaft and positioned to engage said fingers to impart radial movement to said bars, and yieldable means for engaging said bars for resisting said radial movement.

4. A chuck of the character described comprising a shaft, spaced apart sets of pivoted fingers carried by said shaft, glass-engaging bars supported by said fingers, collars slidably mounted on said shaft and positioned to engage the respective sets of fingers to impart radial movement to said bars, means for yieldingly resisting said radial movement, and means for sliding said collars one after the other.

5. A chuck of the character described comprising a shaft, spaced apart sets of pivoted fingers carried by said shafts, glass-engaging bars supported by said fingers, means for successively moving said sets of fingers one after the other, whereby said bars are adjusted radially to expanded positions, and means for retracting said bars when expanding pressure has been removed from said fingers.

6. A chuck of the character described comprising a shaft, spaced apart sets of pivoted fingers carried by said shaft, glass-engaging bars supported by said fingers, collars for rocking said fingers to adjust said bars radially to expanded position, and means for retracting said bars when expanding pressure has been removed from said fingers.

7. A chuck of the character described comprising a shaft, spaced apart sets of pivoted fingers carried by said shaft, glass-engaging bars supported by said fingers, collars for rocking said fingers to adjust said bars radially to expanded position, means for retracting said bars when expanding pressure has been removed from said fingers, means for actuating said collars, and means for providing a lost motion connection between said actuating means and one of said collars.

8. A chuck of the character described comprising a shaft, spaced apart sets of triangular fingers pivotally supported on one shaft, and having rearwardly extended projections, glass-engaging bars supported by said fingers, means engaging said projections for moving said fingers to adjust said bars radially, and means for retracting said bars when expanding pressure has been removed from said fingers.

9. A chuck of the character described comprising a shaft, spaced apart sets of triangular fingers pivotally supported on said shaft, and having rearwardly extended projections, glass-engaging bars supported by said fingers, collars engaging said projections, means engaging said projections for moving said fingers to adjust said bars radially, means for retracting said bars when expanding pressure has been removed from said fingers, means to actuate said collars, and means for providing a lost motion connection between said actuating means and one of said collars.

10. A chuck of the character described comprising a shaft, spaced apart sets of pivoted fingers carried by said shaft, glass-engaging bars supported by said fingers, collars for rocking said fingers to adjust said bars radially to expanded position, means for retracting said bars when expanding pressure has been removed from said fingers, an actuating rod, pins connecting said collars with said rod, and means for engaging said rod to hold said collars yieldingly in engagement with said fingers.

11. A chuck of the character described comprising a shaft, spaced apart sets of pivoted fingers carried by said shaft, glass-engaging bars supported by said fingers, collars for rocking said fingers to adjust said bars radially to expanded position, means for retracting said bars when expanding pressure has been removed from said fingers, an actuating rod, and pins connecting said collars with said rod, one of said collars having a slotted connection with its pin to provide limited lost motion.

12. A chuck of the character described comprising a hollow shaft, spaced apart hubs carried thereby, pivoted fingers carried by the hubs, collars slidably mounted on said shaft and positioned to engage said fingers, a spring pressed draw bar within said shaft, means for moving said draw bar longitudinally, and means for connecting said draw bar and said collars.

13. A chuck of the character described comprising a hollow shaft, spaced apart hubs carried thereby, pivoted fingers carried by the hubs, collars slidably mounted on said shaft and positioned to engage said fingers, a spring pressed draw bar within said shaft, means for moving said draw bar longitudinally, and pins connecting said collars and said draw bar, one of said collars being slotted to permit lost motion between the same and its pin.

In testimony whereof I have hereunto set my hand.

JOHN A. MILLIKEN.